United States Patent

[11] 3,566,895

| [72] | Inventor | Isamu Goto |
| | | Tokorozawa-shi, Japan |
| [21] | Appl. No. | 792,367 |
| [22] | Filed | Jan. 21, 1969 |
| [45] | Patented | Mar. 2, 1971 |
| [73] | Assignee | Honda Giken Kogyo Kabushiki Kaisha, Tokyo, Japan |
| [32] | Priority | Jan. 20, 1968 |
| [33] | | Japan |
| [31] | | 43/3509 |

[54] FLUID PRESSURE GOVERNOR
9 Claims, 3 Drawing Figs.

[52] U.S. Cl..................................................... 137/56, 73/539
[51] Int. Cl....................................................... G05d 13/10
[50] Field of Search......................................... 137/56, 54, 53; 73/536, 539

[56] References Cited
UNITED STATES PATENTS

| 2,081,466 | 5/1937 | Tarisien................ | 137/56 |
| 3,139,079 | 6/1964 | Bettoni................. | 137/56X |
| 3,413,991 | 12/1968 | Lewicki................ | 137/56X |
| 3,426,778 | 2/1969 | Blomquist............ | 137/56 |

FOREIGN PATENTS

| 492,137 | 4/1953 | Canada................ | 137/56 |
| 913,753 | 12/1962 | Great Britain...... | 137/56 |

Primary Examiner—Clarence R. Gordon
Attorney—Waters, Roditi, Schwartz & Nissen

ABSTRACT: A fluid pressure governor comprises a rotating shaft having a pressure chamber in communication with a pressure fluid source such as a pump, there being a movable control valve in the chamber to regulate the opening of a discharge outlet, thereby to control the pressure of the fluid in the chamber. A main centrifugal weight engages the valve and a subsidiary centrifugal weight is resiliently connected to the main weight and is limited in its angle of swing to a predetermined value by a stop member such that the effect of the two weights is initially applied to the valve until the subsidiary weight is restrained, after which only the additive centrifugal effect of the main weight is applied to the valve.

PATENTED MAR 2 1971  3,566,895

INVENTOR

BY  Isamu Goto

FLUID PRESSURE GOVERNOR

BRIEF SUMMARY OF THE INVENTION

It has been hitherto known that, in an automatic transmission of a motorcar, a fluid having a pressure value corresponding to the speed of rotation of an output shaft (or any other rotating member) is adapted for being used as a control means.

This invention relates to a fluid pressure governor usable for this purpose, and operating under the principle of centrifugal force.

An object of the invention is to provide a fluid pressure governor which regulates the pressure of a fluid so that it varies approximately linearly with respect to a rotating member. Thereby the pressure of the fluid can be utilized as a control means for the operation of an output member for an automatic transmission or the like.

In accordance with the invention there is provided a fluid pressure governor comprising a rotating shaft having a radial chamber therein adapted for receiving a pressure fluid and formed by a blind bore in the shaft, and valve means in the chamber for controlling the flow of pressure fluid from an outlet in the chamber thereby to regulate the pressure in the chamber and thus the pressure supplied to an output means coupled to the chamber. In order to regulate the valve means so that the pressure of the fluid varies approximately linearly with the speed of rotation of the shaft, a main and a subsidiary counterweight are connected by a spring and respectively pivotably connected to the shaft in symmetrical relation, the main counterweight acting on the valve means to displace the same under the combined effect of the pivotal movement of both counterweights under the action of centrifugal force, until the subsidiary counterweight is restrained from further movement by a stop member whereafter only the effect of centrifugal force on the main counterweight is applied to said valve means.

DETAILED DESCRIPTION

Figure 1:
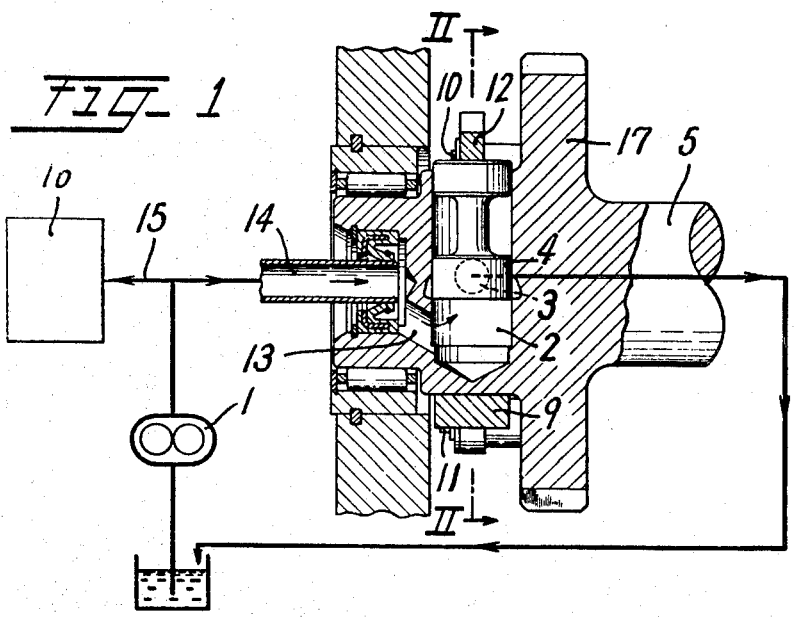
FIG. 1 is a diagrammatic side view partly in section of one embodiment of this invention.
Figure 2:
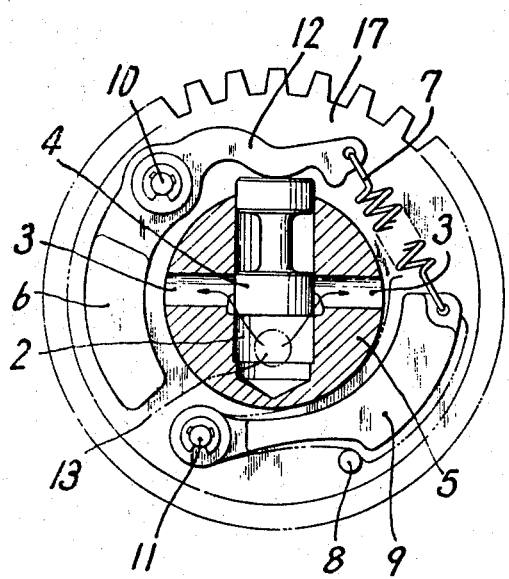
FIG. 2 is a sectional view taken along line II–II in FIG. 1.

In the drawing there is shown a pump 1 for supplying fluid to a chamber 2 which is constituted as a diametrically extending blind bore proximate the end of a rotatable shaft 5. The chamber 2 has outlet passages 3 which lead to a reservoir supplying the pump 1. A valve member 4 is slidably mounted in chamber 2 to control the flow of fluid from outlet 3 and thereby control the pressure of the fluid in the chamber 2. The fluid from pump 1 passes through conduit 14 into inlet 13 and thence to chamber 2. A branch conduit 15 (shown diagrammatically in FIG. 1) supplies the pressurized fluid to an output means 16 which may be operative to control an automatic transmission. A flange 17 is integral with shaft 15 and serves as a drive gear therefor.

A main counterweight 6 is connected to flange 17 by pivot 10 and a subsidiary counterweight 9 is connected to flange 17 by a pivot 11.

The counterweight 6 includes an integral operating arm 12 which acts on valve member 4 to control the position thereof in the chamber 2. The counterweights 6 and 9 are connected together by a spring 7 which is compressed under the centrifugal action of weight 6 and stretched under the centrifugal action of counterweight 9.

A stop member 8 is positioned adjacent counterweight 9 to limit outward pivotal movement thereof. As will be shown later, the arrangement of the counterweights and the stop member is effective to regulate the valve member 4 and produce an approximately linear variation in the pressure of the fluid in chamber 2 with respect to the speed of rotation of shaft 5.

Figure 3:
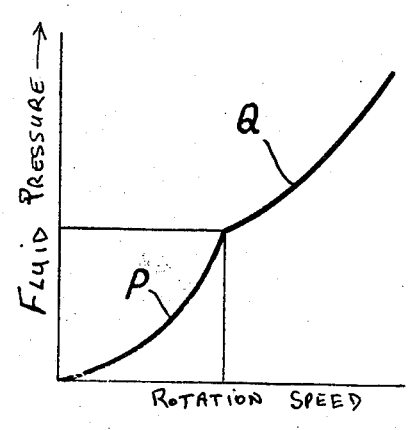
FIG. 3 is a graphical illustration showing the operation characteristic curve of said embodiment.

In operation:

As the speed of rotation of the rotating shaft 5 gradually increases, in a comparatively low-speed range, the additive effect of centrifugal force of the centrifugal weights 6 and 9 gradually increases in proportion to the increase in the speed of rotation of shaft 5, causing the valve member 4 to move in chamber 2 in a direction to close outlet 3. When a particular speed is reached, the weight 9 contacts stop member 8 and is prevented from undergoing further outward movement so that only the centrifugal force of the main centrifugal weight 6 controls the subsequent movement of the valve member 14. The control characteristic curve, i.e. the pressure change in the pressure fluid as a function of rotational speed of shaft 5, shows a substantially linear relation composed of a curve P and a curve Q as shown in FIG. 3.

Thus, according to this invention, the main weight 6 and the subsidiary weight 9 are responsive to centrifugal force and the subsidiary weight 6 is arranged so as not to swing beyond a predetermined angle, so that the operation characteristic curve, i.e., the pressure change in the fluid pressure can become a substantially linear relation over the entire speed range. This is advantageous in the control of output means 16. The two weights 6 and 9 are arranged substantially symmetrically in relation to the center of the rotating shaft 5 so that any rotation imbalance between the two is substantially eliminated.

I claim:

1. A fluid pressure governor comprising a rotating member having a chamber adapted for receiving a pressure fluid, said chamber having an outlet for the pressure fluid, valve means in said chamber for controlling the flow of pressure fluid from said outlet thereby to regulate the pressure of the fluid in the chamber, output means coupled to said chamber and subject to the pressure of the fluid therein, and means acting on said valve means and responsive to the rotation of the rotating member to regulate the pressure of the pressure fluid so that it varies approximately linearly with respect to the speed of rotation of said rotating member, said means which acts on the valve means comprising first and second resiliently interconnected counterweights pivotably connected to said rotating member, one of said counterweights acting on said valve means, and a stop member positioned to limit the magnitude of pivotal movement of the other of said counterweights.

2. A governor as claimed in claim 1, wherein said rotating member has an axis of rotation and said counterweights have pivotal axes which are symmetrical with respect to said axis of rotation.

3. A governor as claimed in claim 2, wherein said valve means comprises a displaceable valve member in said chamber and said one counterweight includes an integral operation arm engaged with said valve member to displace the same.

4. A governor as claimed in claim 3, wherein said rotating member is a shaft and said chamber is constituted by a radial blind bore in said shaft.

5. A governor as claimed in claim 4, wherein said integral operating arm acts externally on said valve member to apply radial force thereto.

6. A governor as claimed in claim 5, wherein said counterweights are positioned relative to said stop member such that the effect of both counterweights, as a result of centrifugal force, is applied to said valve member whereas after said other counterweight has contacted the stop member only the effect of centrifugal force on said one counterweight is applied to said valve member.

7. A governor as claimed in claim 6, wherein said counterweights are outside the shaft, the governor comprising a spring connecting said counterweights such that outward pivotal movement of said one counterweight tends to compress said spring while outward pivotal movement of said other counterweight tends to stretch said spring.

8. A governor as claimed in claim 6 comprising a closed circuit for the pressure fluid including a pump for pressurizing the pressure fluid and a reservoir connected to said outlet from said chamber, said pump being connected to the reservoir.

9. A governor as claimed in claim 8, wherein said closed circuit includes a branch line connected to said output means.